(12) United States Patent
Kontos et al.

(10) Patent No.: US 11,861,705 B2
(45) Date of Patent: *Jan. 2, 2024

(54) SYSTEM AND METHOD FOR AGGRESSIVELY TRADING A STRATEGY IN AN ELECTRONIC TRADING ENVIRONMENT

(71) Applicant: TRADING TECHNOLOGIES INTERNATIONAL, INC., Chicago, IL (US)

(72) Inventors: Nicholas G Kontos, Peoria, IL (US); Sagy Pundak Mintz, Tampa, FL (US); Alexander D. Deitz, New York, NY (US)

(73) Assignee: TRADING TECHNOLOGIES INTERNATIONAL, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/844,122

(22) Filed: Jun. 20, 2022

(65) Prior Publication Data

US 2022/0318908 A1 Oct. 6, 2022

Related U.S. Application Data

(63) Continuation of application No. 17/125,854, filed on Dec. 17, 2020, now Pat. No. 11,393,034, which is a
(Continued)

(51) Int. Cl.
*G06Q 40/00* (2023.01)
*G06Q 40/04* (2012.01)

(52) U.S. Cl.
CPC .................. *G06Q 40/04* (2013.01)

(58) Field of Classification Search
CPC .................................. G06Q 40/04
See application file for complete search history.

(56) References Cited

U.S. PATENT DOCUMENTS

| | | |
|---|---|---|
| 6,098,051 A | 8/2000 | Lupien et al. |
| 7,113,924 B2 | 9/2006 | Fishbain |

(Continued)

FOREIGN PATENT DOCUMENTS

| | | | |
|---|---|---|---|
| CA | 2448974 A1 | 12/2002 | |
| EP | 1081614 A2 * | 3/2001 | ............. G06Q 40/00 |

(Continued)

OTHER PUBLICATIONS

Yan-Xia et al: "Loss Protection in Pairs Trading Through Minimum Profit Bounds: A Cointegration Approach", Hindawi Publishing Corporation, Journal of Applied Mathematics and Decision Sciences, vol. 2006, Article ID73803, pp. 1-14 (Year: 2006).*

(Continued)

*Primary Examiner* — Edward J Baird
(74) *Attorney, Agent, or Firm* — TAROLLI, SUNDHEIM, COVELL & TUMMINO L.L.P.

(57) ABSTRACT

System and method for aggressively trading a spread trading strategy in an electronic environment are provided herein. According to the example embodiments, a trader may configure the automated trading tool to trade as aggressively as possible by leaning on a price without an associated quantity. This allows a trader to possibly obtain a more profitable price as well as get filled faster. Traders submit an order for a spread and the automated trading tool calculates the quote order price based on a defined level of aggressiveness, the leaned on price, and the desired spread price. Based on the level of defined aggressiveness and the gap in the market, the automated trading tool may lean on a mildly, moderately, or extremely aggressive price.

13 Claims, 6 Drawing Sheets

Related U.S. Application Data continuation of application No. 16/213,528, filed on Dec. 7, 2018, now Pat. No. 10,902,516, which is a continuation of application No. 13/933,262, filed on Jul. 2, 2013, now Pat. No. 10,181,157, which is a continuation of application No. 13/553,397, filed on Jul. 19, 2012, now Pat. No. 8,510,212, which is a continuation of application No. 12/128,382, filed on May 28, 2008, now Pat. No. 8,249,977.

(56) References Cited

U.S. PATENT DOCUMENTS

| | | | |
|---|---|---|---|
| 7,437,325 B2 | 10/2008 | Kemp, II et al. | |
| 7,496,531 B1 * | 2/2009 | Gastineau | G06Q 40/00 705/37 |
| 7,542,937 B1 | 6/2009 | Cohen | |
| 7,565,313 B2 | 7/2009 | Waelbroeck et al. | |
| 7,577,600 B1 | 8/2009 | Zagara et al. | |
| 7,613,647 B1 | 11/2009 | Cushing et al. | |
| 7,620,588 B1 | 11/2009 | Duquette | |
| 7,644,030 B2 | 1/2010 | Burns et al. | |
| 7,672,896 B2 | 3/2010 | Burns et al. | |
| 7,680,722 B2 | 3/2010 | Bok et al. | |
| 7,689,499 B1 | 3/2010 | Duquette | |
| 7,734,532 B2 | 6/2010 | Fishbain | |
| 7,774,261 B1 | 8/2010 | Mintz et al. | |
| 7,774,262 B1 | 8/2010 | Mintz et al. | |
| 7,904,370 B2 | 3/2011 | Singer et al. | |
| 7,904,371 B2 | 3/2011 | Davidowitz et al. | |
| 7,974,906 B2 | 7/2011 | Madhavan et al. | |
| 8,140,423 B2 | 3/2012 | Hansen et al. | |
| 8,244,621 B1 | 8/2012 | Swearingen et al. | |
| 8,249,977 B2 | 8/2012 | Kontos et al. | |
| 8,510,212 B2 | 8/2013 | Kontos et al. | |
| 8,583,536 B1 | 11/2013 | Deitz et al. | |
| 10,181,157 B2 | 1/2019 | Kontos et al. | |
| 10,903,516 B2 | 1/2021 | Kontos et al. | |
| 2001/0032162 A1 | 10/2001 | Alsberg et al. | |
| 2001/0042040 A1 | 11/2001 | Keith | |
| 2002/0007335 A1 | 1/2002 | Millard et al. | |
| 2002/0116317 A1 | 8/2002 | May | |
| 2003/0004852 A1 * | 1/2003 | Burns | G06Q 40/06 705/37 |
| 2003/0177126 A1 | 9/2003 | Weingard et al. | |
| 2003/0233306 A1 | 12/2003 | Madhavan et al. | |
| 2003/0236737 A1 | 12/2003 | Kemp, II et al. | |
| 2004/0034591 A1 | 2/2004 | Waelbroeck et al. | |
| 2004/0177024 A1 | 9/2004 | Bok et al. | |
| 2004/0193526 A1 | 9/2004 | Singer et al. | |
| 2004/0267655 A1 | 12/2004 | Davidowitz et al. | |
| 2005/0154668 A1 | 7/2005 | Burns et al. | |
| 2005/0171889 A1 * | 8/2005 | Daley | G06Q 20/102 705/37 |
| 2005/0240510 A1 | 10/2005 | Schweickert et al. | |
| 2006/0020536 A1 | 1/2006 | Renton et al. | |
| 2006/0036532 A1 | 2/2006 | Silverman et al. | |
| 2006/0059077 A1 * | 3/2006 | Goodman | G06Q 40/04 705/37 |
| 2006/0129473 A1 | 6/2006 | Hansen et al. | |
| 2006/0224492 A1 | 10/2006 | Pinkava | |
| 2006/0265309 A1 | 11/2006 | Sweeting et al. | |
| 2006/0287944 A1 | 12/2006 | Fishbain | |
| 2007/0016506 A1 | 1/2007 | Davies et al. | |
| 2007/0078749 A1 * | 4/2007 | Burns | G06Q 40/00 705/37 |
| 2007/0078752 A1 | 4/2007 | Burns et al. | |
| 2007/0260559 A1 | 11/2007 | Ginsberg | |
| 2007/0265953 A1 | 11/2007 | Cunningham et al. | |
| 2007/0276748 A1 * | 11/2007 | Shapiro | G06Q 40/03 705/37 |
| 2008/0021809 A1 * | 1/2008 | Waelbroeck | G06F 3/04847 700/89 |
| 2008/0243709 A1 | 10/2008 | Mintz et al. | |
| 2009/0018944 A1 | 1/2009 | De Verdier | |
| 2009/0299890 A1 | 12/2009 | Kontos et al. | |
| 2009/0327153 A1 | 12/2009 | Milne | |
| 2012/0284170 A1 | 11/2012 | Kontos et al. | |
| 2014/0172665 A1 | 6/2014 | Kontos et al. | |
| 2019/0108590 A1 | 4/2019 | Kontos et al. | |
| 2021/0103987 A1 | 4/2021 | Kontos et al. | |

FOREIGN PATENT DOCUMENTS

| | | | |
|---|---|---|---|
| EP | 1507225 A1 | 2/2005 | |
| WO | WO-9114231 A1 * | 9/1991 | G06F 15/21 |
| WO | 2006/127415 A2 | 11/2006 | |
| WO | 2008/110783 A1 | 9/2008 | |
| WO | 2009/146363 A1 | 12/2009 | |

OTHER PUBLICATIONS

International Search Report and Written Opinion of International Application No. PCT/US2009/045449, dated Jun. 30, 2009 (dated Jul. 14, 2009).

Stoll, Hans R., "Electronic Trading in Stock Markets," Journal of Economic Perspectives, vol. 20, No. 1, Winter 2006, pp. 153-174.

Nevmyvaka et al: "Electronic trading in order-driven markets: efficient execution" Seventh IEEE International Conference on E-commerce Technology (Year: 2005).

* cited by examiner

SYSTEM AND METHOD FOR AGGRESSIVELY TRADING A STRATEGY IN AN ELECTRONIC TRADING ENVIRONMENT

CROSS REFERENCE TO RELATED APPLICATIONS

This application is a continuation of U.S. patent application Ser. No. 17/125,854, filed Dec. 17, 2020, which is a continuation of U.S. patent application Ser. No. 16/213,528 filed Dec. 7, 2018, now U.S. Pat. No. 10,902,516, which is a continuation of U.S. patent application Ser. No. 13/933,262 filed Jul. 2, 2013, now U.S. Pat. No. 10,181,157, which is a continuation of U.S. patent application Ser. No. 13/553,397 filed Jul. 19, 2012, now U.S. Pat. No. 8,510,212, which is a continuation of U.S. patent application Ser. No. 12/128,382 filed May 28, 2008, now U.S. Pat. No. 8,249,977, entitled "System and Method for Aggressively Trading a Strategy in an Electronic Trading Environment," the contents of each of which are fully incorporated herein by reference for all purposes.

FIELD OF THE INVENTION

The present invention is directed to electronic trading. More specifically, the present invention is directed towards aggressively trading a strategy in an electronic trading environment.

BACKGROUND

Electronic trading generally refers to a trading system that electronically matches orders by an electronic trading platform. Current examples of electronic trading platforms include the Chicago Mercantile Exchange ("CME") Globex® trading system, the Chicago Board of Trade ("CBOT") e-cbot, and Eurex, just to name a few. A trading system that matches orders electronically is also referred to herein as an "electronic exchange." Exchanges like the CME Group, which includes the CME and CBOT, currently offer trading via open outcry in addition to electronic trading.

With respect to electronic exchanges, traders connect to an electronic trading platform by way of a communication link through their client devices. Once connected, traders select which tradeable objects they wish to trade. As used herein, the term "tradeable object" refers to anything that can be traded with a quantity and/or a price. It includes, but is not limited to, traded events, goods and/or financial products such as stocks, options, bonds, futures, currency, and warrants, as well as funds, derivatives and collections of the foregoing, and all types of commodities, such as grains, energy, and metals. The tradeable object may be "real," such as products that are listed by an exchange, or "synthetic," such as a combination of real products that is created by the trader. A tradeable object could actually be a combination of other tradeable objects, such as a class of tradeable objects.

Sometimes, on their machines, traders use automated or semi-automated trading tools, collectively hereinafter referred to as "automated tools" that automatically or semi-automatically send orders to the exchange. Such automated tools are usually provided, among other things, to facilitate fast and accurate order entry. For instance, an automated tool might quickly calculate one or more order parameters, such as an order price or order quantity, based on market conditions or some other reference condition, and then automatically send an order with these parameters to an exchange for matching.

In addition to trading individual tradeable objects, many traders often implement trading strategies that involve simultaneous trading of two or more tradeable objects. One such trading strategy is commonly referred to as spread trading. In general, spread trading is the buying and/or selling of one, two, or more tradeable objects, one purpose of which is to capitalize on changes or movements in the relationships between the tradeable objects. The tradeable objects that are used to complete a spread are referred to as the outright markets or legs of the spread. A spread trade could involve buying tradeable objects, buying and selling tradeable objects, selling tradeable objects or some combination thereof.

A commercially available trading tool that facilitates the automatic trading of spreads is Autospreader™ from Trading Technologies International, Inc. of Chicago, Illinois Once the legs of the spread are chosen and the relationship between them are defined, a trader can input a desired spread price and quantity, and the Autospreader™ will automatically work orders in the legs to achieve the desired spread (or attempt to achieve the spread). The Autospreader™ is currently an add-on tool available with X TRADER® Pro™, which is a trading application also available from Trading Technologies International, Inc. U.S. patent application Ser. No. 10/137,979, entitled, "System and Method for Performing Automatic Spread Trading," filed on May 3, 2002, the contents of which are fully incorporated by reference herein, describes an automated spread trading tool.

Using an automated trading tool such as Autospreader™, a trader can input a price to buy or sell the spread, and the automated trading tool will automatically work orders in the legs to achieve, or attempt to achieve the trader's desired price for the spread. For instance, a trader might define buying a spread as buying in leg A and selling in leg B. According to that definition, if the trader inputs a desired price to buy the spread, the automated trading tool will place a buy order in leg A, based on the best price that a sell order could be filled at in leg B. The best price in leg B is also known as the price that the buy order in leg A is based on, or the "leaned on price". The leaned on price is located at the price level that has sufficient quantity available to satisfy the quantity of the order placed in leg A. If a price level does not have sufficient quantity, then the automated tool leans on the next price level that does such that the risk of getting legged up is reduced. The instant that the order in leg A is filled, the automated trading tool submits an offsetting hedge order to leg B at the leaned on price. However, if at the time that the order in leg A is filled there is insufficient quantity available at the leaned on price, then the trader may become "legged up" and there will be an increased likelihood that the trader's spread will fail.

As the market in leg B moves, the order in leg A may be re-priced to achieve the desired spread price. Re-pricing an order typically involves canceling the existing order and replacing it with a new order at another price. While effective for achieving a desired spread price, re-pricing can result in the new order being placed at the end of an order queue corresponding to the order's new price at the electronic exchange. If, the new order loses queue position, then it may decrease the likelihood that the order will get filled, or increase the likelihood that the trader will get "legged up."

SUMMARY

The embodiments described herein provide a system and method for aggressively trading a spread trading strategy in an electronic trading environment. To illustrate the present invention and aspects thereof, the following description, including the figures and detailed description, provides examples that can be used or readily modified by one of ordinary skill to generate a system or method that benefits from the teachings described and claimed herein.

In many instances, spotting an opportunity in the market and capitalizing on the opportunity before a competing trader or before the market moves, can separate the traders who are successful from the ones who are not. An important component in capitalizing on opportunities involves the trader quickly acting on that market information to enter an order as quickly as possible. One such way to increase the speed of an order submission is to use automated trading tools, such as Autospreader™. Autospreader™ automatically submits an offsetting order once an order in the first leg is filled, therefore eliminating the chance of a trader delay when submitting the order.

Additionally, capitalizing on a trading opportunity may require the trader to trade more aggressively or riskier than normal. However, when using the conventional method to trade spread trading strategies, a trader is limited in the degree of risk to apply to each order, as the conventional method attempts to eliminate the risk of getting legged up. While reducing the chance of getting legged up is extremely useful and important, there may be missed opportunities for profit due to re-pricing an order or only leaning on price levels that have sufficient quantity available.

According to an example embodiment, the automated trading tool leans on a price without an associated quantity. One or more prices without an associated quantity are also known as a "gap" in the market and may present added opportunities to make a profit for the trader. By leaning on a price within a gap, a trader may be able to get a more profitable price for the trading strategy.

According to the present embodiments, this method allows a trader to determine a level of aggressiveness to trade a spread trading strategy when there is a gap in the market. A trader may configure the automated trading tool to trade mildly, moderately, or extremely aggressive. If, for example, a trader is mildly aggressive, the automated trading tool will quote a limit order in leg A by leaning on one price level above the best bid or one price level below the best ask. If the trader is buying the spread then the automated trading tool will lean on the price level above the best bid. Similarly, if the trader is selling the spread then the trading tool will lean on the price level below the best ask. This is the price where the trader believes an offsetting limit order will get filled but for a more profitable price. While there may not currently be any quantity available at the price level above the best bid or below the best ask, other traders may be willing to more quickly buy at a higher price or sell at the lower price instead of waiting for the market to come to them. Additionally, the offsetting order placed at the leaned on price may get filled faster as the order will be first in the order queue for that price level within the gap.

According to another example embodiment, if a trader is moderately aggressive and there is more than one price level within gap in the market, the automated trading tool will quote the limit order in leg A by leaning on two price levels above the best bid or below the best ask. If the trader is buying the spread then the automated trading tool will lean on two price levels above the best bid. Similarly, if the trader is selling the spread then the trading tool will lean on two price levels below the best ask. This is a price level that will increase the possible profit for the trader even further than if the trader was mildly aggressive, but has a greater risk of getting legged up. As previously stated, while there may not currently be any quantity available at that price level, other traders may be willing to more quickly buy at a higher price or sell at the lower price instead of waiting for the market to move.

According to yet another example embodiment, if a trader is extremely aggressive and there is more than one price level within gap in the market, the automated trading tool will quote the limit order in leg A by leaning on one price level below the best ask or one price level above the best bid. If the trader is buying the spread then the automated trading tool will lean on the price level below the best ask. Similarly, if the trader is selling the spread then the trading tool will lean on the price level above the best ask. This price level provides the greatest risk and reward for the trader as there is a higher chance of the spread getting legged up but also the highest possible profit for the trader if the offsetting limit order is filled.

Other examples are provided herein. Modifications may also be made to the system and methods without departing from the spirit or scope of the invention. Additional features and advantages of the embodiments will be set forth in the description that follows. The features and advantages of the example embodiment may be realized and obtained through the embodiments particularly pointed out in the appended claims. These and other features will become more fully apparent from the following description, figures, and appended claims, or may be learned by the practice of the example embodiments as set forth hereinafter.

BRIEF DESCRIPTION OF THE FIGURES

Example embodiments are described herein with reference to the following drawings, in which.

DETAILED DESCRIPTION

The present invention is related to aggressively trading a spread trading strategy in an electronic trading environment. To illustrate aspects of the present invention, a system and method are illustrated in example form using the drawings referred to herein. One of ordinary skill in the art will recognize, however, that such examples may be quickly and readily adaptable using the teachings described herein. Aspects of the present invention are protected by the accompanying claims. Limitations from the patent specification should not be improperly incorporated into the claims unless explicitly stated or otherwise inherently known.

I. A First Example Trading System

Figure 1:
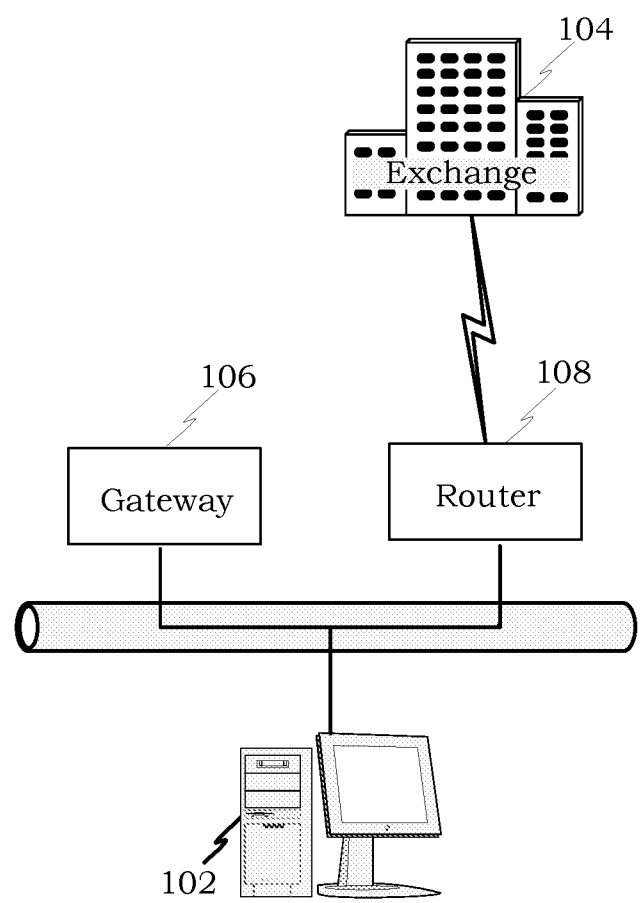
FIG. 1 illustrates an example electronic trading system for trading, wherein the trading system includes a trading station where a trader can submit bids and offers for a tradeable object being traded at an electronic exchange.

FIG. 1 illustrates an example electronic trading system in which the example embodiments may be employed. In this example, the trading system comprises a client device 102 that accesses an electronic exchange 104 through a gateway 106. Router 108 is used to route messages between the gateway 106 and the electronic exchange 104. The electronic exchange 104 includes a computer process (e.g., the central computer) that matches buy and sell orders sent from the client device 102 with orders from other client devices (not shown). The electronic exchange 104 may list one or more tradeable objects for trading. While not shown in FIG. 1 for the sake of clarity, the trading system may include other devices that are specific to the client site like middleware and security measures like firewalls, hubs, security managers, and so on, as understood by a person skilled in the art.

Regardless of the types of order execution algorithms used, the electronic exchange 104 provides market information to the subscribing client device 102. Market information may include data that represents just the inside market. The inside market is the lowest sell price (best ask) and the highest buy price (best bid) at a particular point in time. Market information may also include market depth. Market depth refers to quantities available at the inside market and can also refer to quantities available at other prices away from the inside market. The quantity available at a given price level is usually, although not necessarily, provided by the host exchange in aggregate sums. In other words, an exchange usually provides the total buy quantity and the total sell quantity available in the market at a particular price level in its data feed. The extent of the market depth available to a trader usually depends on the exchange. For instance, some exchanges provide market depth for all (or most) price levels, while some provide only quantities associated with the inside market, and others may provide no market depth at all. Additionally, the exchange 104 can offer other types of market information such as the last traded price (LTP), the last traded quantity (LTQ), and order fill information.

The computer employed as the client device 102 generally can range from a hand-held device, laptop, or personal computer to a larger computer such as a workstation with multiple multiprocessors. Generally, the client device 102 includes a monitor (or any other output device) and an input device, such as a keyboard, a trackball, and/or a two or three-button mouse to support click based trading, if so desired. One skilled in the art of computer systems will understand that the present example embodiments are not limited to any particular class or model of computer employed for the client device 102 and will be able to select an appropriate system.

The computer employed as the gateway 106 generally can range from a personal computer to a larger or faster computer. Generally, the gateway 106 may additionally include a monitor (or any other output device), input device, and access to a database, if so desired. One skilled in the art of computer systems will also understand that the present example embodiments are not limited to any particular class or model of computer(s) employed for the gateway 106 and will be able to select an appropriate system.

It should be noted that a computer system that may be employed here as a client device or a gateway generally includes a central processing unit, a memory (a primary and/or secondary memory unit), an input interface for receiving data from a communications network, an input interface for receiving input signals from one or more input devices (for example, a keyboard, mouse, etc.), and an output interface for communications with an output device (for example, a monitor). A system bus or an equivalent system may provide communications between these various elements.

In general, it should be understood that the devices described herein could include hardware objects developed using integrated circuit development technologies, or yet via some other methods, or the combination of hardware and software objects that could be ordered, parameterized, and connected in a software environment to implement different functions described herein. Also, the hardware objects could communicate using electrical signals, with states of the signals representing different data.

It should also be noted that the client device 102 generally executes application programs resident at the client device 102 under the control of the operating system of the client device 102. Also, the gateway 106 executes application programs resident at the gateway 106 under the control of the operating system of the gateway 106. In other embodiments and as understood by a person skilled in the art, the function of the application programs at the client device 102 may be performed by the gateway 106, and likewise, the function of the application programs at the gateway 106 may be performed by the client device 102.

The actual electronic trading system configurations are numerous, and a person skilled in the art of electronic trading systems would be able to construct a suitable network configuration. For the purposes of illustration, some example configurations are provided to illustrate where the elements may be physically located and how they might be connected to form an electronic trading system. These illustrations are meant to be helpful to the reader, and they are not meant to be limiting. According to one example illustration, the gateway device may be located at the client site along with the trading station, which is usually remote from the matching process at the electronic exchange. According to this instance, the trading station, the gateway, and the router may communicate over a local area network, and the router may communicate with the matching process at the electronic exchange over a T1, T3, ISDN, or some other high speed connection.

In another example illustration, the client site may be located on the actual grounds of the electronic exchange (for example, in the building of the exchange). According to this instance, the trading station, the gateway, and the router may still communicate over a local area network, but the router may communicate with the matching process at the electronic exchange through another connection means besides a T1, T3, or ISDN. In yet another example illustration, the gateway may be housed at, or near, its corresponding electronic exchange. According to this instance, the client device may communicate with the gateway over a wide area network or through the use of a T1, T3, ISDN, or some other high speed connection.

Further, the gateway may be located remote from the client device and remote from the electronic exchange, which might be particularly useful in systems that include interconnection of multiple trading networks. Thus, one trading network might have gateway access to an electronic exchange. Then, other trading networks may communicate with the trading network that has gateway access through a T1, T3, ISDN, or some other high speed connection.

II. A Second Example Trading System

Figure 2:
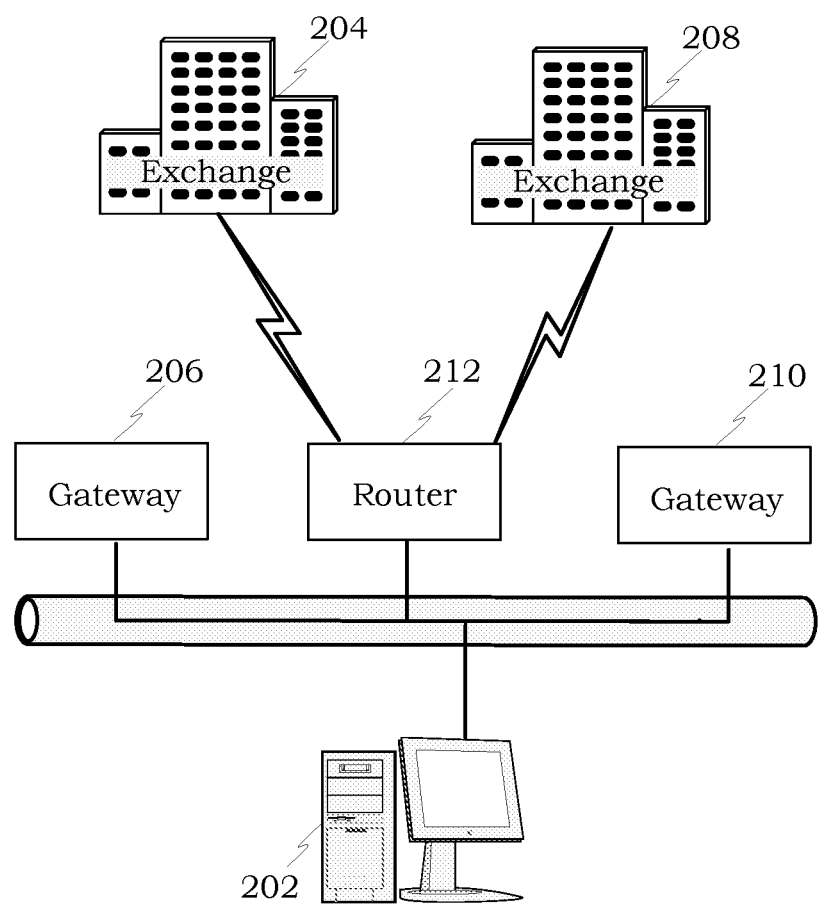
FIG. 2 illustrates another example electronic trading system for electronic trading, wherein this trading system includes a trading station where a trader can submit bids and offers for a tradeable object being traded at more than one electronic exchange.

FIG. 2 illustrates another example electronic trading system that uses similar computer elements as shown in FIG. 1, in which a trader may access and trade at multiple electronic exchanges. The system comprises a client device 202 that can access multiple electronic exchanges 204 and 208. In this particular embodiment, electronic exchange 204 is accessed through gateway 206 and electronic exchange 208 is accessed through another gateway 210. Alternatively, a single gateway may be programmed to handle more than one electronic exchange. Router 212 is used to route messages between the gateways 206 and 210 and the electronic exchanges 204 and 208. While not shown in the figure, the system may include other devices that are specific to the client site like middleware and security measures like firewalls, hubs, security managers, and so on, as understood by a person skilled in the art. Additional electronic exchanges may be added to the system so that the trader can trade at any number of exchanges, if so desired.

The trading system presented in FIG. 2 provides the trader with the opportunity to trade tradeable objects listed at different electronic exchanges. To some traders, there can be many advantages with a multi-exchange environment. For example, a trader could view market information from each tradeable object through one common visual display. As such, price and quantity information from the two separate exchanges may be presented together so that the trader can view both markets simultaneously in the same window. In another example, a trader can spread trade different tradeable objects listed at the different electronic exchanges.

As indicated earlier, one skilled in the art of electronic trading systems will understand that the present embodiments are not limited to the particular configurations illustrated and described with respect to FIG. 1 and FIG. 2, and will be able to design a particular system based on the specific requirements (for example, by adding additional exchanges, gateways, client devices, routers, or other computers serving various functions like message handling and security). Additionally, several networks, like either of the networks shown in FIG. 1 or FIG. 2, may be linked together to communicatively access one or more electronic exchanges.

III. Client Device

Client devices 102 and 202 can be computers, such as a workstation, desktop, laptop, handheld device, and so forth, that allow a trader to trade one or more tradeable objects that are offered at exchange(s). A client device may include at least a processor and memory. Preferably, the processor has enough processing power to handle and process various types of market information. The more market information is received and processed, the more processing power is preferred. However, any present day processor has enough capability to perform at least the most basic part of the present invention.

Memory may include a computer readable medium. The term computer readable medium, as used herein, refers to any medium that participates in providing instructions to a processor unit for execution. Such a medium may take many forms, including but not limited to, non-volatile media, and transmission media. Non-volatile media include, for example, optical or magnetic disks, such as storage devices. Volatile media include, for example, dynamic memory, such as main memory or random access memory ("RAM"). Common forms of computer readable media include, for example, floppy disks, flexible disks, hard disks, magnetic tape, punch cards, CD-ROM, a RAM, a PROM, an EPROM, a FLASH-EPROM, and any other memory chip or cartridge, or any other medium from which a computer can read.

When a client device receives market information or other data, such as news, or charting data, and order related information from an exchange, the received information may be displayed to the trader(s) on the visual output device or display device. However, it should be understood that the information could be provided to a trader using other means such as sound. The output device can be any display device. For example, the display could be a CRT-based video display, an LCD-based or a gas plasma-based flat-panel display, a display that shows three-dimensional images, or some other type of display.

Upon viewing the market information or a portion thereof, a trader may wish to send orders to an exchange, cancel orders, change orders, query an exchange, and so on. To do so, the trader may input various commands or signals into a client device such as by typing into a keyboard, inputting commands through a mouse, or inputting commands or signals through some other input device. For instance, a trader may click a mouse button to initiate an order to buy a particular quantity of the tradeable object at a particular price. Then, a client device preferably generates transaction information. There are many different types of messages and/or order types that can be submitted, all of which may be considered various types of transaction information. Once generated, transaction information is sent from a client device to one or more host exchanges over communication links.

In one example embodiment, a client device uses software to create specialized interactive trading screens on terminals associated with them. Trading screens preferably enable traders to, among other things, enter and execute orders, obtain market quotes, and monitor positions. The range and quality of features available to the trader on his or her trading screen may vary according to the specific software application being run. In addition to or in place of the interactive trading screens, a client device could run automated types of trading applications.

IV. An Example Trading Station

Figure 3:
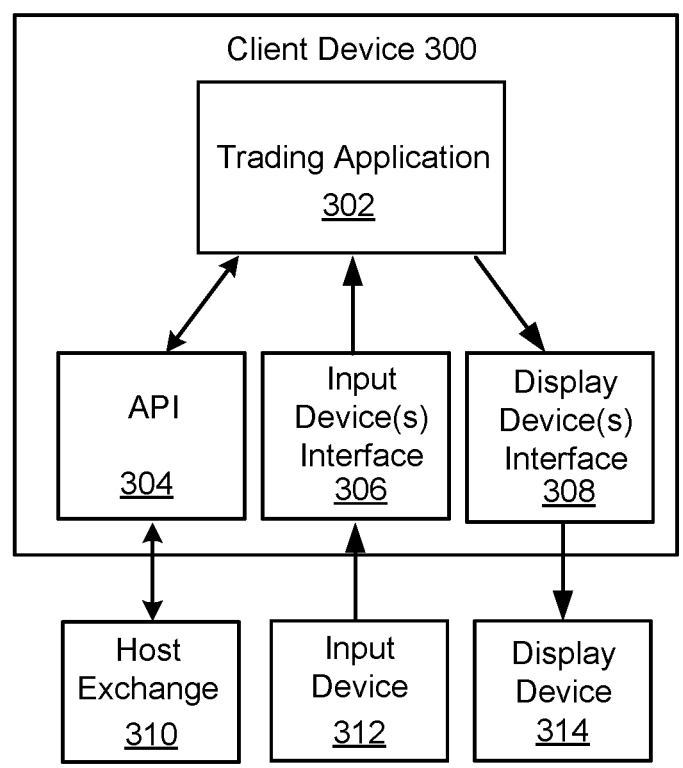
FIG. 3 illustrates an example trading station of either FIG. 1 or FIG. 2 where a trader can submit bids and offers for a tradeable object being traded at one or more exchanges.

FIG. 3 illustrates an example trading station 300 which is similar to the type of trading stations 102 and 202 shown in FIGS. 1 and 2. Trading station 300 can be any particular type of computing device, examples of which were enumerated above. According to one example embodiment, trading station 300 has a trading application 302 stored in memory that when executed arranges and displays market information in many particular ways, usually depending on how the trader prefers to view the information. Trading application 302 may also implement an automated trading tool such as the automated spread trading tool that automatically sends orders into underlying legs to achieve a spread.

Preferably, trading application 302 has access to market information from one or more exchanges 310 through API 304 (or application programming interface), and trading application 302 can also forward transaction information to exchange 310 via API 304. Alternatively, API 304 could be distributed so that a portion of the API rests on the trading station 300 and a gateway, or at the exchange 310. Additionally, trading application 302 may receive signals from input device 312 via input device interface 306 and can be given the ability to send signals to display device 314 via display device interface 308.

Alternatively, the example embodiments described herein may be a separate program from trading application 302, but still stored in memory and executed on the trading station 300. In another alternative embodiment, the preferred embodiments may be a program stored in memory and executed on a device other than trading station 300. Example devices may include a gateway or some other well known intermediary device.

V. Automatic Spread Trading Overview

According to one embodiment of an automated spread trading tool, a trader can select two or more individual tradeable objects, to create a "synthetic spread" that is sometimes referred hereinafter interchangeably as a "spread". Each tradeable object may be referred to as a "leg" of the spread. The automatic spread trading tool preferably generates spread data based on information in the legs and based on spread setting parameters, which may be configurable by a trader. The spread data may be communicated to a graphical user interface where it is displayed and where data corresponding to the legs of the spread may be displayed as well. At the client device, the trader can enter orders in the spread window, and the automated spread trading tool will automatically work orders in the corresponding legs to achieve, or attempt to achieve (because the fill of the order is not always guaranteed) a desired spread.

Figure 4:
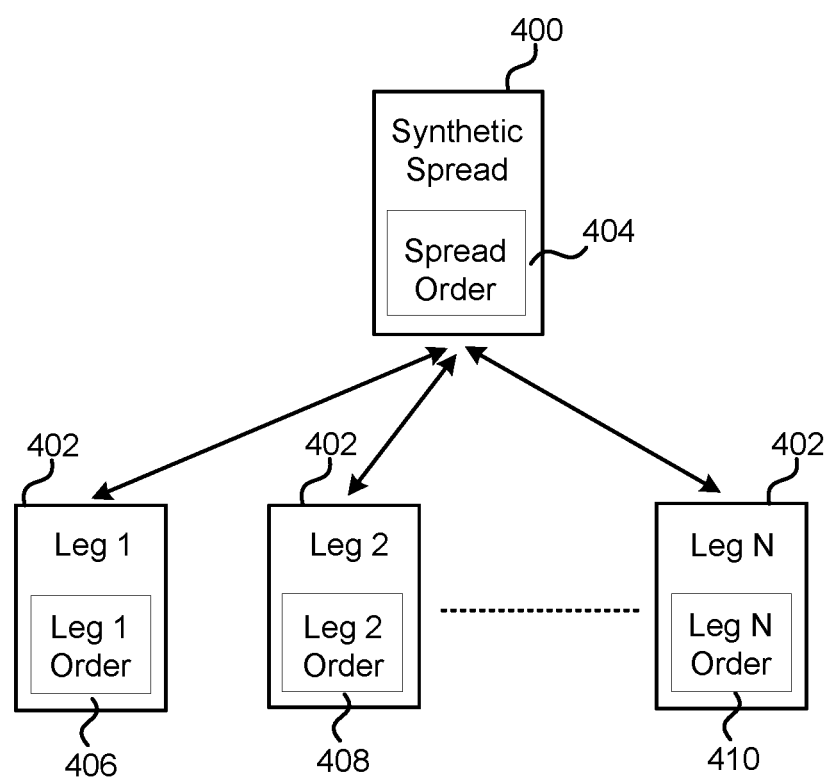
FIG. 4 is a block diagram illustrating an example relationship between a synthetically created spread and its underlying "N" number of legs.

FIG. 4 is a block diagram illustrating the relationship between a synthetically created spread 400, its underlying N legs 402, and a spread order 404 that has been entered. When a trader enters an order to buy or to sell the spread (e.g., represented as spread order 404) in a synthetic market, the automated spread trading tool automatically places orders in the appropriate legs to achieve or attempt to achieve the desired spread 404. For example, to achieve spread order 404, the automated spread trading tool may automatically enter orders 406, 408, 410 into the underlying legs 402. The automated spread trading tool may, among other things, calculate the quantities and prices for the orders 406, 408, 410 based on market conditions in the other legs and one or more parameters. It should be understood that an order to buy or sell the spread is simply an order price and an order quantity associated with the spread.

Using FIG. 4, let's assume that a spread order 404 has been entered into the market. When a trader enters an order to buy or to sell the spread (e.g., spread order 404) in a synthetic market, the automated spread trading tool automatically places orders in the appropriate legs to achieve or attempt to achieve the desired spread 404. For example, to achieve synthetic spread order 404, the automated spread trading tool may automatically enter orders 406, 408, . . . 410 into the underlying legs 402 (e.g., "Leg 1," "Leg 2," . . . "Leg N"). The automated spread trading tool may, among other things, calculate the quantities and prices for the orders 406, 408, 410 based on market conditions in the other legs and one or more parameters.

For example, according to the conventional method to trade a spread, consider if "Leg 1 Order" 406 is a buy order, then the price of order 406 may be based on the leaned on price of "Leg 2" and on the leaned on price of each leg through "Leg N." In other words, the price of order 406 leans on the quantity at the corresponding price level in "Leg 2" though "Leg N." Of course, depending on the trading strategy, the price of order 406 might be based only on some of the legs and not on all N legs. Alternatively, other trading strategies may be used to determine the price and quantities of the orders. Of course, the order parameters of an order in one leg can lean on other types of market conditions in the other legs such as the last traded price (LTP), the last traded quantity (LTQ), a theoretical value, multiple quantities such as quantities closer to the inside market, or some other reference point.

VI. Aggressively Trading a Spread Trading Strategy

Figure 5:
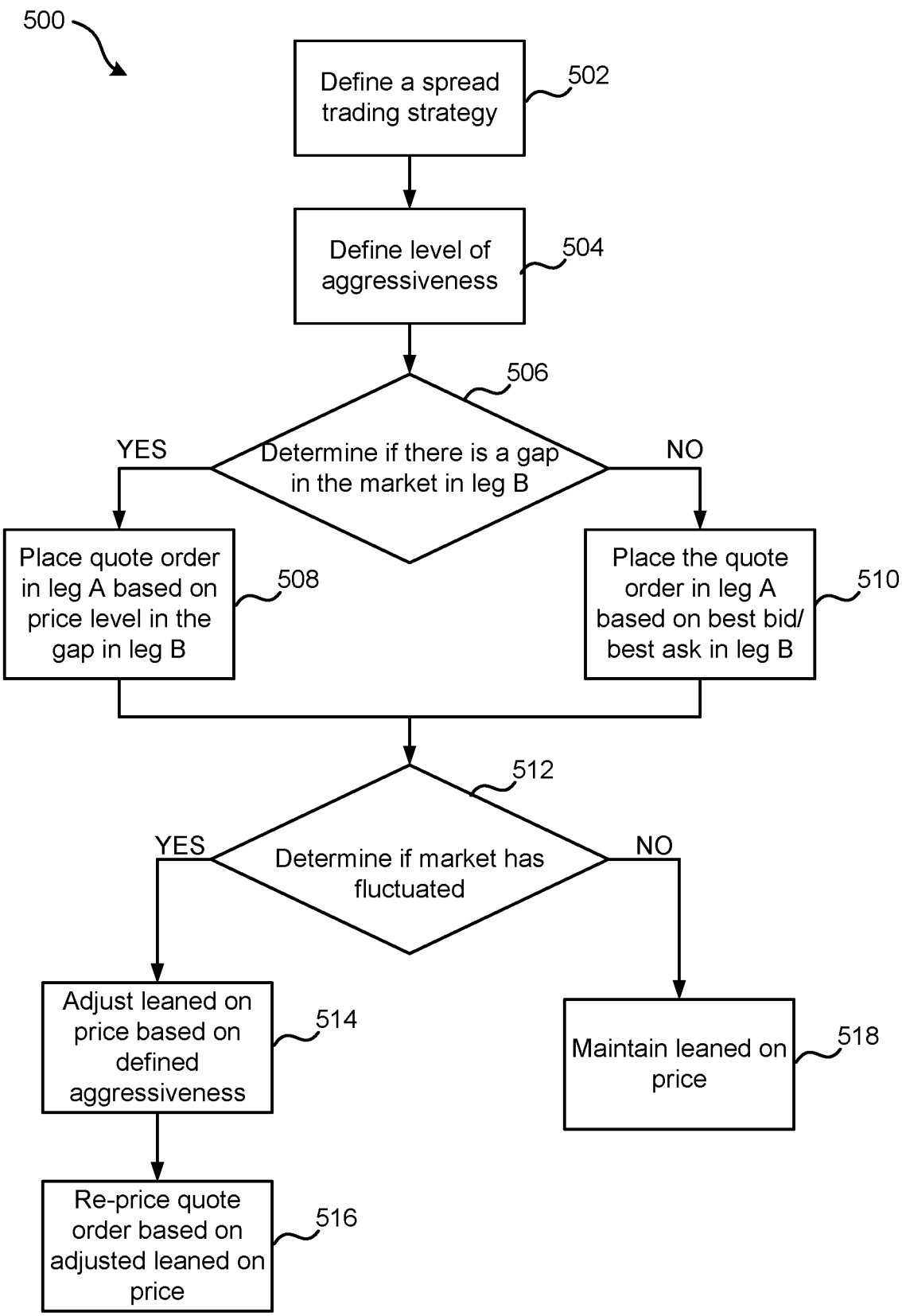
FIG. 5 is a flow chart illustrating an example method for aggressively trading a spread trading strategy in an electronic trading environment.

FIG. 5 is a flow chart 500 illustrating an example method for aggressively trading a spread trading strategy in an electronic trading environment. It should be understood that flow chart 500 only shows the functionality and operation of a possible implementation of the example method. In this regard, each block may represent a module, a segment, or a portion of the program code, which includes one or more executable instructions for implementing specific logical functions or steps in the process. Alternative implementations are included within the scope of the example embodiments of the present invention in which functions may be executed out of order from that shown or discussed, including substantially concurrent or in reverse order, depending on the functionality involved, as would be understood by those reasonably skilled in the art of the present invention.

At step 502, the trader defines a spread using the automated trading tool. The spread may consist of N legs, however, in the examples described below, the spread has been defined as a 2 legged spread.

At step 504, the trader defines the level of aggressiveness to associate with the spread. The trader may choose a different level of aggressiveness, based on for example, knowledge of the market, volume being traded, market fluctuations, or the trader's own personal choice. When a gap in the market exists, the trader may choose to have the automated trading tool mildly, moderately, or extremely aggressively lean on a price in leg B to quote the order in leg A.

According to the example embodiments, if a trader chooses to trade mildly aggressive, then the automated trading tool will quote the order in leg A by leaning on one price level above the best bid or one price level below the best ask. As previously described, if the trader is buying the spread then the automated trading tool will lean on the price level above the best bid. Similarly, if the trader is selling the spread then the trading tool will lean on the price level below the best ask. This is the price where the offsetting order may get filled just as quickly as if it were placed at the current best bid, but for a better price. While there may not currently be any quantity available at the price level above the best bid or below the best ask, other traders may be willing to more quickly buy at a higher price or sell at the lower price instead of waiting for the market to move. It should be understood that both the quote order placed in leg A and the offsetting order sent to leg B are both limit orders.

According to another example embodiment, the trader may choose to trade moderately aggressive if there is more than one price level within the gap in the market. In this instance, the automated trading tool will quote the order in leg A by leaning on two price levels above the best bid or below the best ask. As previously discussed, if the trader is buying the spread then the automated trading tool will lean on two price levels above the best bid. Similarly, if the trader is selling the spread then the trading tool will lean on two price levels below the best ask. This is a price level that will further increase the possible profit for the trader, but has a greater risk of getting legged up.

According to yet another example embodiment, the trader may choose to trade extremely aggressive if there is more than one price level within the gap in the market. In this instance, the automated trading tool will quote the order in leg A by leaning on one price level below the best ask or one price level above the best bid. As previously described, if the trader is buying the spread then the automated trading tool will lean on the price level below the best ask. Similarly, if the trader is selling the spread then the trading tool will lean on the price level above the best ask. This price level provides the greatest risk and reward for the trader as there is a higher chance of the spread getting legged up but also the highest possible profit for the trader if the order is filled.

Additionally, the trader may modify the level of aggressiveness on the fly during a trading session. This is useful during circumstances of increased trading volume due to, for example, industry news being released such as unemployment data. Similarly, the trader may desire to modify the level of aggressiveness based on that day's history of profits/losses. If the trader has had a successful day of trading thus far, he may increase the level of aggressiveness. Likewise, if a trader has had an unsuccessful day of trading, he may decrease the level of aggressiveness or turn off the aggressive spreading option all together.

In an additional embodiment, the automated trading tool may dynamically determine the level of aggressiveness for the trader. The automated trading tool may track the trader's trading history and dynamically increase or decrease the level of aggressiveness based on for example, market conditions, profit/loss, or the amount of volume being traded.

At step 506, the automated trading tool determines if there is a gap in the market. As previously defined, a gap in the market is one or more price levels without an associated quantity. According to the example embodiments, by leaning on a price in a gap, a trader may be able to get a better price for the trading strategy as well as possibly get filled faster.

At step 508, the automated trading tool has determined that there is a gap in the market. Based on how many price levels are within the gap and the defined level of aggressiveness, the automated trading tool will lean on a price within the gap. According to the example embodiments, if there is only one price level within the gap, then regardless of the level of aggressiveness, the automated trading tool will lean on that price level. In the instance that there is more than one price level in the gap, then the automated trading tool will use the level of defined aggressiveness to determine which price level to lean on before quoting the order in leg A. Additionally, if the trader has not defined a level of aggressiveness, then the trading tool can be programmed to lean on the best bid or best ask, or some other designated price(s).

At step 510 the automated trading tool has determined that there is not a gap in the market, in other words, the market is tight and the best bid and best ask are not separated by another price level. In this circumstance, the automated trading tool will quote the order in leg A based on the best bid or best ask in leg B. If a gap in the market occurs, then the automated trading tool may modify the leaned on price in leg B and may lean on a price that is more aggressive.

At step 512 the automated trading tool evaluates the market at a later time and determines if the market has fluctuated and if an existing price gap has increased or decreased.

At step 514 the automated trading tool modifies the leaned on price in leg B that the quote order in leg A is based on. If the gap in the market has increased then, the leaned on price may be modified to be more aggressive. Similarly, if the gap in the market has decreased, then the leaned on price may be modified to be less aggressive.

At step 516 the automated trading tool re-prices the quote order in leg A based on the adjusted leaned on price in leg B. The quote order in leg A is re-priced whenever the leaned on price in leg B changes, such as when the gap in the market increases or decreases.

At step 518 the automated trading tool has not detected a fluctuation in the market and will maintain the existing leaned on price in leg B.

It should be understood that any time the leaned on price changes in leg B, the quote order in leg A will be re-priced, unless other automated trading tools, such as slop are being applied. Accordingly, slop assists the automated trading tool by regulating the automatic re-pricing of orders in legs to achieve a desired spread by allowing a trader to input one ore more range of inside and outside parameters to variably control order entry. Slop is described in U.S. patent application Ser. No. 10/403,333, filed on Mar. 31, 2003 and entitled, "System and Method for Variably Regulating Automatic Order Entry in an Electronic Trading Environment," the contents of which are incorporated herein by reference.

VII. Aggressive Spread Trading Example

Figure 6:
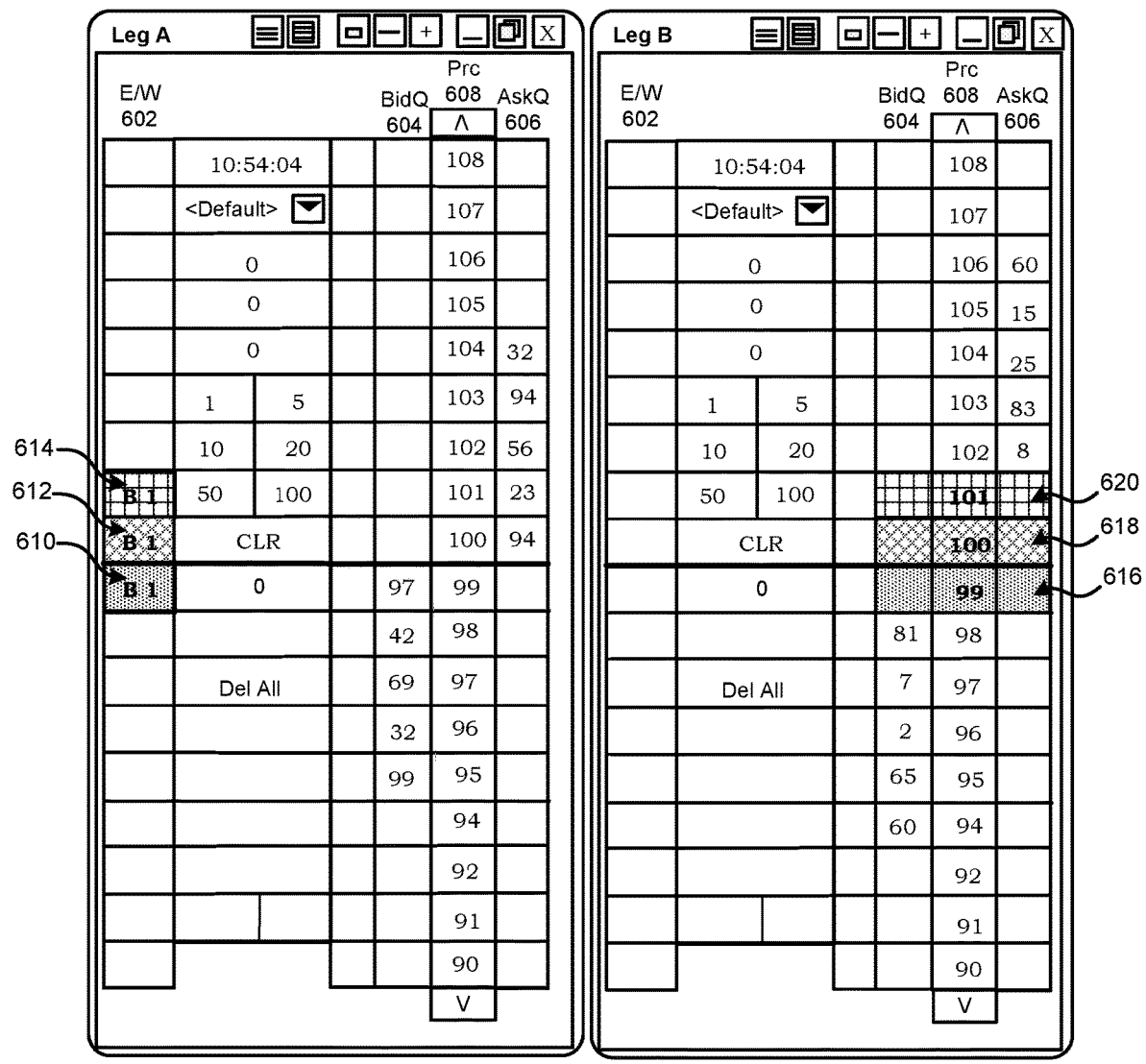
FIG. 6 is a block diagram illustrating an example method of aggressively quoting an order in leg A by leaning on a price within a gap in the market in leg B.

FIG. 6 is a block diagram illustrating an example method of aggressively quoting an order in leg A by leaning on a price within the gap in leg B. Specifically, FIG. 6 includes the trading screens 600 associated with legs A and B of the defined spread. The trading screens display a working quantity column 602, bid quantity column 604, ask quantity column 606, price column 608, and the working quote order 610, 612, and 614. The working quantity column 602 displays desired orders to buy or sell quantity of that tradeable object. The bid quantity column 604 displays buy order quantities available in relation to certain price levels in price column 608. The ask quantity column 606 displays offer order quantities available in relation to certain price levels in price column 608. The price column 608 displays the price levels associated with the legs involved in the spread trading strategy. The working quote order 610, 612, and 614 display an order that was entered by the automated trading tool based on the trader's desired spread price and the defined level of aggressiveness. As shown in FIG. 6, quote order 612 coincides with a mild level of aggressiveness and the leaned on price 616; quote order 614 coincides with the moderate level of aggressiveness and the leaned on price 618; and quote order 614 coincides with the extreme level of aggressiveness and the leaned on price 620.

In the following examples, the trader is buying the configured spread, such that the automated tool will place a buy order in leg A and an offsetting sell order in leg B. Alternatively, when the trader is selling the spread the automated trading tool would place a sell order in leg A and the offsetting buy order in leg B. Additionally, a trader could configure the automated tool to place buy orders in both legs or to place sell orders in both legs.

According to the example embodiments as shown in FIG. 6, the trader has defined a desired level of aggressiveness. To submit a quote order to leg A, the automated trading tool determines which price to lean on in leg B by using the desired spread price of "0" and the trader's defined level of aggressiveness. It should be understood that the example embodiments are not limited to spread price of "0" and that any spread price may be chosen as the desired spread price by a trader.

Using the conventional method, the leaned on price would be the best bid in leg B, price level "98", resulting in the quote order being placed at a price level of "98" in leg A. However, according to the example embodiments, based on the defined level of aggressiveness, the automated trading tool leans on a more aggressive price within the gap in the market. Specifically, if the defined level of aggressiveness is mild, then the automated trading tool leans on price level "99" in leg B, shown at 616, and a quote order is placed at a price level of "99" in leg A, shown at 610. When the quote order 610 is filled, then an offsetting order will be sent to the electronic exchange for a price of "99." If the offsetting order is filled at the leaned on price level of "99" instead of the price of "98" the trader will make more profit or possibly get filled faster.

According to the example embodiments as shown in FIG. 6, if the trader has defined the desired level of aggressiveness as moderate, then the automated trading tool leans on the price level of "100" in leg B, shown at 618, and a quote order is placed at a price level of "100" in leg A, shown at 612. When the quote order 612 is filled, then an offsetting order will be sent to the electronic exchange for a price of "100." If the offsetting order is filled at the leaned on price level of "100" in instead of "98" or "99," then the trader will make even more profit.

In an additional example embodiment, if the trader has defined the level of aggressiveness as extreme, then the automated trading tool leans on the most aggressive price level available, which is "101" in leg B, shown at 620. When the quote order in leg A, shown at 614, is filled, then the offsetting order will be sent to the price level "101" in leg B, shown at 620. Additionally, if the offsetting order is filled at the leaned on price level of "101" instead of at "98, 99, or 100," then the trader will make even more profit that if the level of aggressiveness was set to mild or moderate.

Alternatively, it is possible that the best bid and best ask may fluctuate as the market fluctuates. If the gap in the market decreases, the automated trading tool may modify the leaned on price to coincide with the gap in the market. As previously discussed, it should be understood that if the leaned on price in leg B is modified, then the quote order price in leg A will also be modified. For example, based on FIG. 6, if the level of aggressiveness was defined as extreme, the trading tool would lean on the price level of "101," shown at 620. However, if the market fluctuated and the gap decreased by one price level, such that the price level "100" was the most aggressive price available, then the automated trading tool would modify the leaned on price to "100." The quote order in leg A, shown at 616, would be re-priced to a price level of "100" to coincide with the modified leaned on price in leg B.

In an additional embodiment, if the trader defined the level of aggressiveness as moderate and there was, for example, an increase in trading volume, the automated trading tool may dynamically adjust the level of aggressiveness to "extreme." Using FIG. 6, if the initial level of aggressiveness was set to moderate, the leaned on price would be "100," shown at 618. With an increase in volume, the automated trading tool may dynamically modify the leaned on the price to a price level of "101" instead of "100." The quote order in leg A, shown at 612, would be re-priced to a price level of "101" as well to coincide with the modified leaned on price in leg B. Additionally, if a trader recognized an increase in trading volume, the trader may manually adjust the level of aggressiveness on the fly.

The above description of the example embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

It will be apparent to those of ordinary skill in the art that methods involved in the system and method for aggressively trading a spread trading strategy may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A computer-readable medium having stored therein instructions for an automated trading tool, the instructions for the automated trading tool being executable by a processor to perform operations, the operations comprising:

receiving a desired strategy price for a trading strategy including a first tradeable object and a second tradeable object;

receiving first market information for the first tradeable object from a first electronic exchange over a network and second market information for the second tradeable object from a second electronic exchange over the network, wherein the first market information includes a first inside market for the first tradeable object, wherein the second market information includes a second inside market for the second tradeable object, wherein the first inside market includes a best bid and a best ask for the first tradeable object, wherein the second inside market includes a best bid and a best ask for the second tradeable object;

determining whether the first inside market for the first tradeable object includes a market gap between the best bid and the best ask for the first tradeable object, wherein the market gap includes a plurality of price levels between the best bid and the best ask for the first tradeable object without an available quantity;

determining a leaned-on price at a selected price level of the plurality of price levels within the market gap, wherein the selected price level of the leaned-on price within the market gap is determined based on a level of quoting aggressiveness, wherein the selected price level is at least one price level above the best bid price for the first tradeable object when the first tradeable object would be bought according to the trading strategy, wherein the selected price level is at least one price level below the best ask for the first tradeable object when the first tradeable object would be sold according to the trading strategy;

calculating a quote order price for a quote order for the second tradeable object of the trading strategy based on the leaned-on price associated with the selected price level and the desired strategy price; and automatically submitting the quote order for the second tradeable object at the calculated quote order price to the second electronic exchange over the network.

2. The computer-readable medium of claim 1, wherein the selected price level is one price level above the best bid for the first tradeable object when the first tradeable object would be bought according to the trading strategy, wherein the selected price level is one price level below the best ask for the first tradeable object when the first tradeable object would be sold according to the trading strategy.

3. The computer-readable medium of claim 1, wherein the selected price level is two price levels above the best bid for the first tradeable object when the first tradeable object would be bought according to the trading strategy, wherein the selected price level is two price levels below the best ask for the first tradeable object when the first tradeable object would be sold according to the trading strategy.

4. The computer-readable medium of claim 1, wherein the level of quoting aggressiveness includes a user-selected level of quoting aggressiveness.

5. The computer-readable medium of claim 1, wherein operations for the automated trading tool further comprise:
receiving a selected of the level of quoting aggressiveness from a plurality of levels of aggressiveness.

6. The computer-readable medium of claim 1, wherein operations for the automated trading tool further comprise:
adjusting the leaned-on price based on the level of quoting aggressiveness and the market gap.

7. The computer-readable medium of claim 6, wherein adjusting the leaned-on price is in response to a market fluctuation in the first market information for the first tradeable object.

8. The computer-readable medium of claim 7, wherein operations for the automated trading tool further comprise:
re-pricing the quote order based on the adjusted leaned-on price.

9. The computer-readable medium of claim 1, wherein the operations for the automated trading tool further comprise:
dynamically modifying the level of quoting aggressiveness based on at least any one of trading volume, market activity, a trader's historical trading activity, and current trading activity.

10. The computer-readable medium of claim 1, wherein the quote order is a limit order.

11. The computer-readable medium of claim 1, wherein the operations for the automated trading tool further comprise:
submitting, in response to receiving an indication that at least a portion of the quote order was filled, an offsetting hedge order for the first tradeable object to the first electronic exchange over the network.

12. The computer-readable medium of claim 1, wherein the first exchange is the same as the second exchange.

13. The computer-readable medium of claim 1, wherein the first exchange is different than the second exchange.

\* \* \* \* \*